US011308160B2

(12) United States Patent
Cooper et al.

(10) Patent No.: US 11,308,160 B2
(45) Date of Patent: Apr. 19, 2022

(54) THREADED LINKING POINTER MECHANISM

(71) Applicant: Apple Inc., Cupertino, CA (US)

(72) Inventors: Peter Cooper, San Jose, CA (US); Louis G. Gerbarg, San Francisco, CA (US); Nick Kledzik, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 16/146,535

(22) Filed: Sep. 28, 2018

(65) Prior Publication Data

US 2019/0370459 A1    Dec. 5, 2019

Related U.S. Application Data

(60) Provisional application No. 62/679,831, filed on Jun. 3, 2018.

(51) Int. Cl.
*G06F 21/54* (2013.01)
*G06F 16/901* (2019.01)

(52) U.S. Cl.
CPC ......... *G06F 16/9024* (2019.01); *G06F 21/54* (2013.01)

(58) Field of Classification Search
CPC .......... G06F 16/9024; G06F 16/24562; G06F 21/54
See application file for complete search history.

(56) References Cited

U.S. PATENT DOCUMENTS

| | | | | |
|---|---|---|---|---|
| 6,802,006 B1* | 10/2004 | Bodrov | .................. | G06F 21/64 713/164 |
| 8,743,907 B1* | 6/2014 | Kadosh | .................. | H04L 47/34 370/394 |
| 2002/0100017 A1* | 7/2002 | Grier | ........................ | G06F 8/54 717/120 |
| 2006/0190924 A1* | 8/2006 | Bruening | ................ | G06F 12/12 717/104 |
| 2016/0028857 A1* | 1/2016 | Dickinson, III | ........ | H04L 67/42 709/203 |
| 2017/0139696 A1* | 5/2017 | Yehuda | ..................... | G06F 8/61 |
| 2017/0262387 A1* | 9/2017 | Sell | ..................... | G06F 12/0864 |

* cited by examiner

*Primary Examiner* — Jay A Morrison
(74) *Attorney, Agent, or Firm* — Baker & Hostetler LLP

(57) ABSTRACT

One embodiment provides for a computer-implemented method comprising generating a linked list table including a first component having linking data to be stored in a table data structure for one or more rebase and bind operations and second a component having instructions to implement the table data structure to perform the rebase and bind operations according to a linked list chain and executing the instructions in the second component of the linked list table to perform the one or more rebase and bind operations based on the linked list chain.

17 Claims, 12 Drawing Sheets

500 rebase information:
segment section    address         type     value
__DATA  __data    0x100008008    pointer   0x100007F94 with value 0x100007F94
__DATA  __data    0x100008010    pointer   0x100008018 with value 0x100008018 bind information:
segment section    address         type     addend dylib      symbol
__DATA  __data    0x100008000    pointer   0 libSystem    printf with value
0x5008000000000000
no compressed rebase info opcodes:
0x0000 BIND_SUBOPCODE_THREADED_SET_BIND_ORDINAL_TABLE_SIZE_ULEB(1)
0x0002 BIND_OPCODE_SET_DYLIB_ORDINAL_IMM(2)
0x0003 BIND_OPCODE_SET_SYMBOL_TRAILING_FLAGS_IMM(0x00, printf)
0x000C BIND_OPCODE_SET_TYPE_IMM(1)
0x000D BIND_OPCODE_DO_BIND()
0x000E BIND_OPCODE_SET_SEGMENT_AND_OFFSET_ULEB(0x02, 0x00000000)
0x0010 BIND_SUBOPCODE_THREADED_APPLY
0x0011 BIND_OPCODE_DONE

FIG. 5A rebase information:

| segment | section | address | type | value |
|---|---|---|---|---|
| __DATA | __data | 0x100008008 | pointer | 0x100007F94 with value 0x0000800010007F94 |

(JOP: diversity 0, address false, IA)

| __DATA | __data | 0x100008010 | pointer | 0x100008018 with value 0x0000000100008018 | bind information:

| segment | section | address | type | addend | dylib | symbol |
|---|---|---|---|---|---|---|
| __DATA | __data | 0x100008000 | pointer | 0 | libSystem | printf with value |

0x5008000000000000 (JOP: diversity 0, address false, IA)
no compressed rebase info opcodes:
0x0000 BIND_SUBOPCODE_THREADED_SET_BIND_ORDINAL_TABLE_SIZE_ULEB(1)
0x0002 BIND_OPCODE_SET_DYLIB_ORDINAL_IMM(2)
0x0003 BIND_OPCODE_SET_SYMBOL_TRAILING_FLAGS_IMM(0x00, printf)
0x000C BIND_OPCODE_SET_TYPE_IMM(1)
0x000D BIND_OPCODE_DO_BIND()
0x000E BIND_OPCODE_SET_SEGMENT_AND_OFFSET_ULEB(0x02, 0x00000000)
0x0010 BIND_SUBOPCODE_THREADED_APPLY
0x0011 BIND_OPCODE_DONE

*FIG. 5B*

FIG. 8A 64-bit Pointer 800

| Ordinal (16-bit) 811 | Reserved (16-bit) 812 | Addend (19-bit) 813 | Next (11-bit) 814 | Bind 1-bit 815 | Auth 1-bit 816 |
|---|---|---|---|---|---|

FIG. 8B 64-bit Pointer 810

| Target (51-bit) 821 | Next (11-bit) 814 | Bind 1-bit 815 | Auth 1-bit 816 |
|---|---|---|---|

64-bit Pointer 830

| Ordinal (16-bit) 811 | Reserved (16-bit) 812 | Diversity (16-bit) 833 | Addr Div 1-bit 834 | Key 2-bit 835 | Next (11-bit) 814 | Bind 1-bit 815 | Auth 1-bit 816 |

*FIG. 8C*

64-bit Pointer 840

| Target (32-bit) 821 | Diversity (16-bit) 833 | Addr Div 1-bit 834 | Key 2-bit 835 | Next (11-bit) 814 | Bind (1-bit) 815 | Auth (1-bit) 816 |

*FIG. 8D*

THREADED LINKING POINTER MECHANISM

RELATED APPLICATIONS

This application claims priority of U.S. Provisional Patent Application No. 62/679,831 having the title "THREADED LINKING POINTER MECHANISM," to Louis G. Gerbarg, filed Jun. 3, 2018 and is incorporated by reference in its entirety to the extent that it is consistent with this disclosure.

TECHNICAL FIELD

This disclosure relates generally to the field of data processing technology, and more specifically to providing authenticated pointers to prevent programming attacks within a general-purpose data processing system.

BACKGROUND OF THE DISCLOSURE

A linker (or link editor) program combines one or more object files generated by a compiler and combines them into a single executable file, library file, or another object file. The linker may be implemented as a dynamic linker that performs operations via rebase and binding. A rebase operation provides a pointer value from one binary file location to another location. A binding operation implements a pointer in an executable to a function in another library. For binding, the dynamic linker finds and retrieves the function using the pointer for storage at a designated location.

Return-oriented programming (ROP) and jump-oriented programming (JOP) based techniques may be implemented to exploit the pointers implemented for rebase and binding. The ROP and JOP techniques enable hackers to execute code in the presence of security defenses. Currently, shadow stacks (e.g., stacks that only include return addresses) are implemented to mitigate ROP and JOP attacks. However, such solutions have limitations.

SUMMARY OF THE DESCRIPTION

One embodiment provides for a computer-implemented method comprising generating a linked list table including a first component having linking data to be stored in a table data structure for one or more rebase and bind operations and a second component having instructions to implement the table data structure to perform the rebase and bind operations according to a linked list chain and executing the instructions in the second component of the linked list table to perform the one or more rebase and bind operations based on the linked list chain.

Another embodiment provides for data processing system comprising a non-transitory machine-readable medium storing a first set of instructions one or more processors to execute the first set of instructions, wherein the first set of instructions, when executed, cause the one or more processors to perform operations including data processing system comprising generating a linked list table including a first component having linking data to be stored in a table data structure for one or more rebase and bind operations and second a component having instructions to implement the table data structure to perform the rebase and bind operations according to a linked list chain and executing the instructions in the second component of the linked list table to perform the one or more rebase and bind operations based on the linked list chain.

Yet a further embodiment provides for a non-transitory machine-readable medium storing instructions which, when executed by one or more processors of an electronic device, cause the one or more processors to perform operations comprising generating a linked list table including a first component having linking data to be stored in a table data structure for one or more rebase and bind operations and second a component having instructions to implement the table data structure to perform the rebase and bind operations according to a linked list chain and executing the instructions in the second component of the linked list table to perform the one or more rebase and bind operations based on the linked list chain.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which:

FIGS. 5A & 5B illustrate embodiments of a rebase/bind table structure;

FIGS. 8A-8D illustrate embodiment of a pointer data structure;

DETAILED DESCRIPTION

Reference in the specification to "one embodiment" or "an embodiment" means that a feature, structure, or characteristic described in conjunction with the embodiment can be included in at least one embodiment of the invention. The appearances of the phrase "in one embodiment" in various places in the specification do not necessarily all refer to the same embodiment.

The processes depicted in the figures that follow can be performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

Exemplary Modular Compiler

Figure 1:
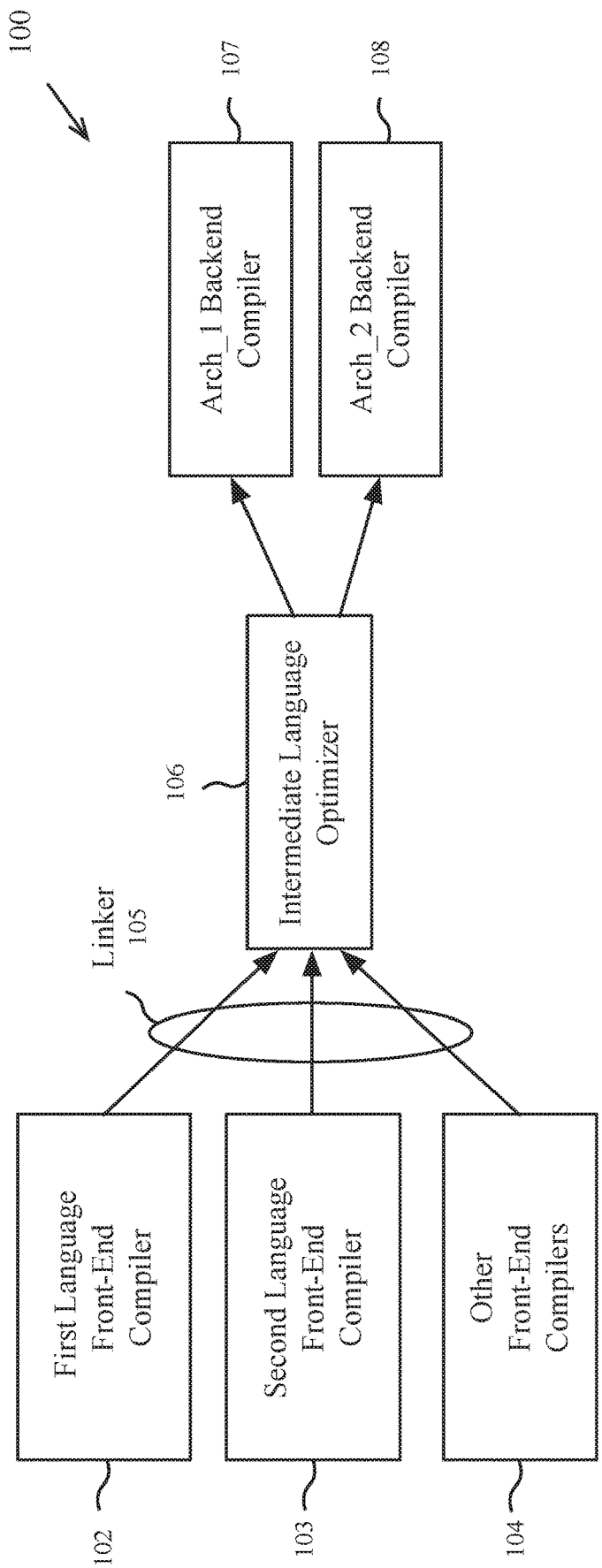
FIG. 1 is a block diagram illustrating a compiler system, according to an embodiment.

FIG. 1 is a block diagram illustrating an embodiment of a modular compiler system 100, according to an embodiment described herein. The modular compiler system 100 provides support for multiple front-end compilers, including a first front-end compiler 102, a second front-end compiler 103, and one or more other front-end compilers 104. The first front-end compiler 102 can provide support for various non-C like programming languages, such as the Swift programming language. The second front-end compiler 103 can provide support for various C-language compilers, such as C, C++, and Objective-C. Other front-end compilers 104 can support various other languages. In one embodiment, other front-end compilers 104 include a Java front-end compiler and/or bytecode translator. Each of the multiple front-end compilers can convert source code written in a particular high-level language into a common intermediate representation, such as, for example, the LLVM intermediate representation. Although illustrated in FIG. 1 as including multiple front-end compilers, other modular compiler system embodiments may include different configurations. Thus, the above-described concepts are applicable to any compilation system, including a linker.

A linker 105 can link function and object references between the code modules within the intermediate representation. An intermediate language optimizer 106 can then perform cross-language optimization on the intermediate representation. In one embodiment, the intermediate language optimizer 106, based on one or more requested compile-time optimizations, performs one or more additional link-time optimizations on the resulting intermediate representations output by the multiple front-end compilers. (e.g., cross-module dead code stripping, etc.). Thus, multiple software modules written in multiple high-level source code languages can be optimized at a common point and then cross-optimized, even though the module were each coded in different high-level languages.

The intermediate representation can be stored in a text-based intermediate language or converted into a bitcode representation. The intermediate representation can then be converted by one or more back-end compilers into a machine-language format that is specific to a particular processor architecture. For example, a back-end compiler 107 for a first architecture (e.g., an x86 compatible instruction set architecture) can be used to compile machine code for execution on processors having support for the first architecture, while a back-end compiler 108 for a second architecture (e.g., an ARM compatible instruction set architecture) can be used to compile machine code for execution on processors having support for second architecture.

Exemplary System Runtime Environment

Figure 2:
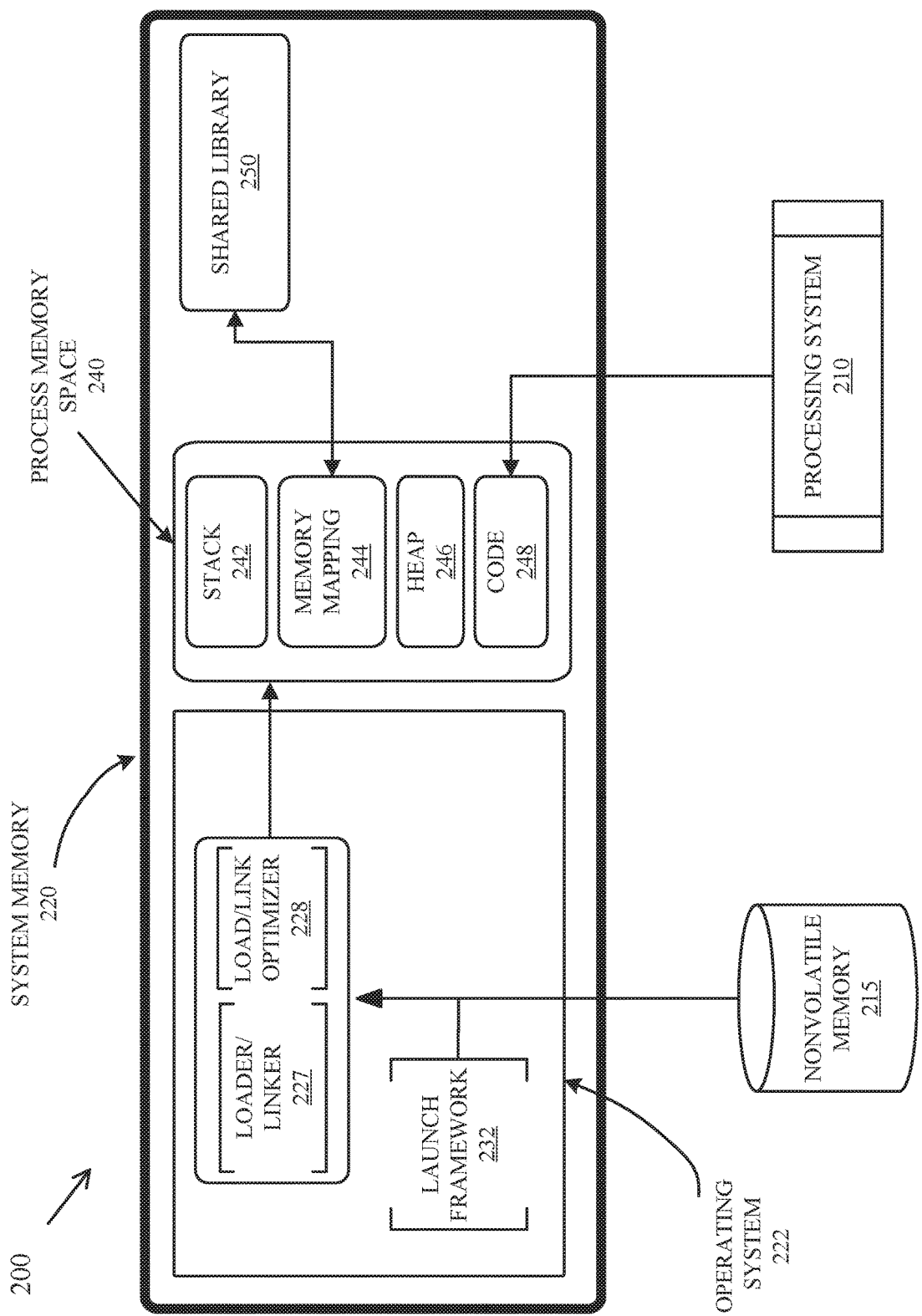
FIG. 2 is a block diagram of a system runtime environment of a data processing system, according to an embodiment.

FIG. 2 is a block diagram of one embodiment of system runtime environment 200 of a data processing system, according to an embodiment. The data processing system contains a processing system 210 including one or more processors, which each can have one or more processor cores. The processing system 210 can direct an operating system 222 running in system memory 220 to load an application developed via an embodiment of the programming system and language for application development as described herein.

In one embodiment, the operating system 222 has an application launch framework 232, which launches applications stored in the nonvolatile memory 215 of the data processing system. In one embodiment, the operating system 222 includes a loader/linker 227 having a load/link optimizer 228 to perform additional link-time and load-time optimizations while loading components of the application into process memory space 240. An example link-time optimization is to bypass the loading of a program function if the function is not called by any other function (e.g., the linker does not resolve any symbols to the function). Should the function become relevant at a later time, the loader/linker 227 may load the function in memory. In one embodiment some modules can be stored as bitcode on nonvolatile memory 215 and a final conversion to machine code is deferred until the module is required by other components of an application. The bitcode can then be compiled by a just-in-time compiler (e.g., just-in-time compiler 130 as in FIG. 1) and loaded into process memory space 240.

The process memory space 240 includes runtime components of the application, including a stack segment 242, a heap segment 246, and a code segment 248. In one embodiment the runtime environment includes a virtual memory system that allows an address space in nonvolatile memory 215 to be mapped into system memory 220. In particular, the code segment 248 of the application can be loaded via a virtual memory mapping from nonvolatile memory 215. Once loaded, the processing system 210 can execute the compiled instructions in the code segment 248.

In one embodiment, the process memory space 240 includes one or more memory mappings 244 from other areas of system memory 220, including memory spaces assigned to other applications or processes. For example, a shared library 250 provided by the system can be loaded into memory and mapped into a memory mapping 244 in the process memory space of the application that is built by an embodiment of the programming system and language for application development.

According to embodiments, loader/linker 227 performs binding and rebase operations. As discussed above, binding occurs when an external function is called by a library. In such an instance, loader/linker 227 provides a name and a request to find the function, as well as a location to where a retrieved value is to be stored. However, a rebase involves a call to a function that is within the same bit-code (or binary). According to one embodiment, loader/linker 227 performs threaded rebase and binding. In such an embodiment, threaded rebase and binding involves an implementation of a linked list structure to perform rebase and binding operations.

Figure 3:
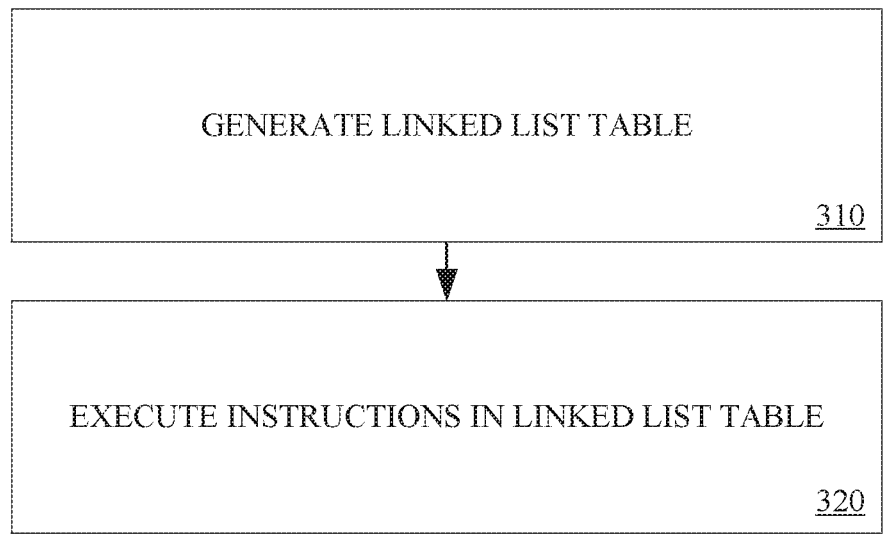
FIG. 3 is a flow diagram illustrating one embodiment of a process for performing threaded rebase/bind operations.

FIG. 3 is a flow diagram illustrating one embodiment of a process for performing threaded rebase and binding operations. At processing block 310, a linked list state machine (opcode table) is generated. According to one embodiment, rebases and binds are inserted as opcodes in an opcode table generated prior to runtime and referenced via a linked list byte code language that that is executed (or walked) when an application is launched by launch framework 232.

Figure 4:
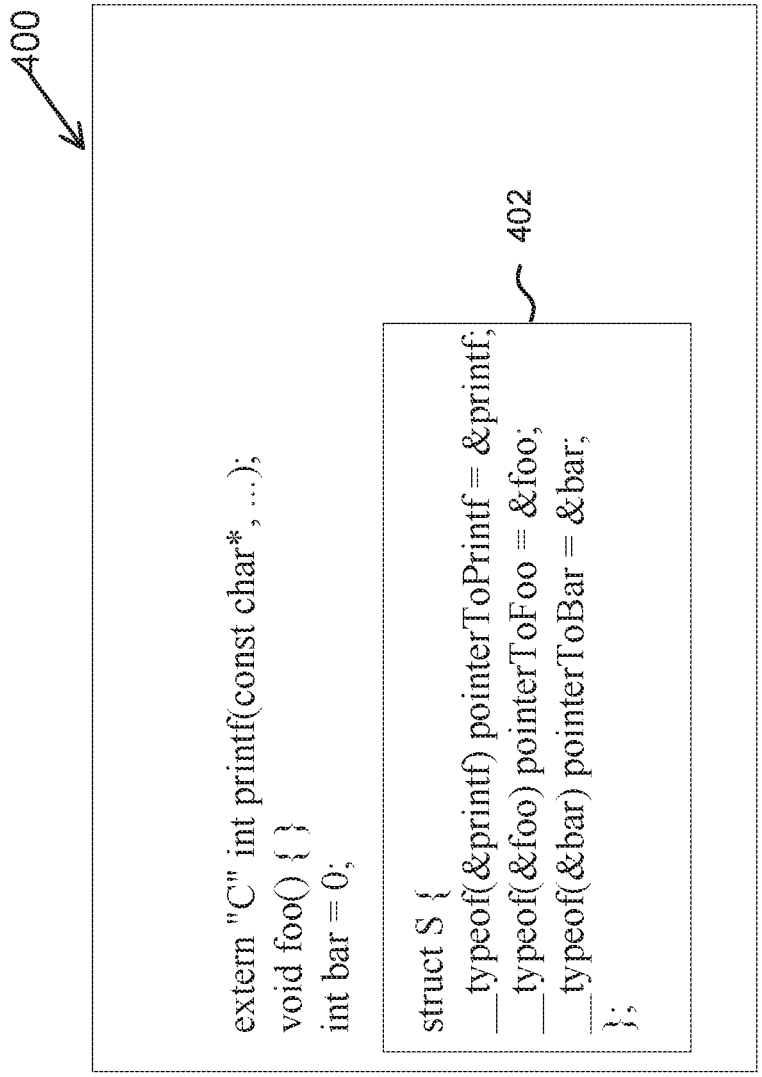
FIG. 4 illustrates one embodiment of a global structure.

In a further embodiment, the byte code language in the opcode table describes how to generate a table data structure (or array), as well as instructions as to how to navigate the data structure. As a result, the byte code language includes a first component that fills the array as its traversed, and second component that instructs how to implement the array. FIG. 4 illustrates one embodiment in which a code block 400 includes a global structure 402 for an example program that implements a threaded rebase/bind table structure 500 shown in FIG. 5A. In one embodiment, the example program includes functions "foo", "bar" and "printf".

Referring to FIG. 4, the global structure 402 includes pointers to "printf", "foo", and "bar". "Printf" is external to the binary and will thus be accessed by a bind operation. "Foo" and "bar" are within the binary and will be accessed via a rebase operation.

As shown in FIG. 5A, structure 500 includes a first component 510, having sub-components 512 and 514 including data corresponding to one or more rebases and one or more binds, respectively. Additionally, structure 500 includes a second component 520 having the actual opcodes. In one embodiment, component 520 comprises a state machine that sets up a state (e.g., which dynamic library (dylib) to point to, flags, etc.). Accordingly, a state to the current offset into the binary is applied each time a . . . DO_REBASE or DO BIND is encountered.

Figure 6:
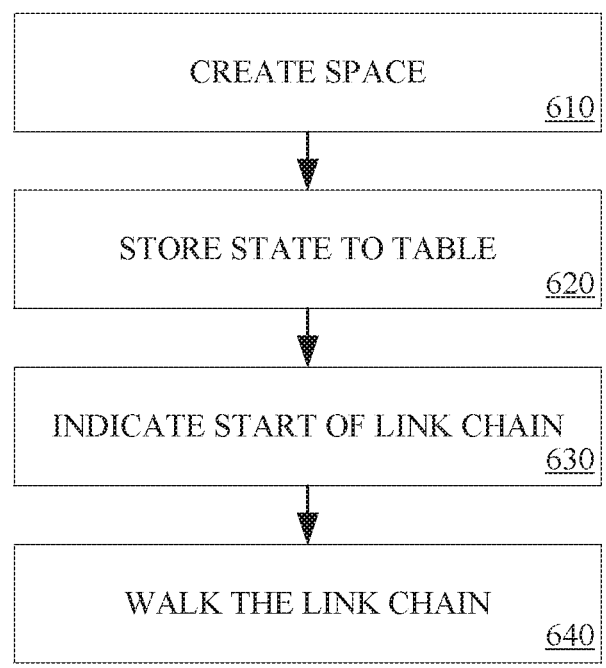
FIG. 6 is a flow diagram illustrating a further embodiment of a process for performing a threaded rebase/bind using a linked list table structure.

Referring back to FIG. 3, the linked list table structure 500 is subsequently executed during runtime, at processing block 320, to perform one or more linking (e.g., threaded rebase/bind) operations to generate a linked list table data structure based on instructions included in components 510 and 520. FIG. 6 is a flow diagram illustrating one embodiment of a process for executing table structure 500 to perform one or more threaded rebase/bind linking operations. According to one embodiment, the operations to execute the table structure described with reference to FIG. 6 are performed by a processing system (e.g., processing system 210) based on logic associated with a linker (e.g., linker 105 or loader/linker 227).

For threaded embodiments a bind or rebase is not immediately performed. Instead a current state is pushed into a table for subsequent index. Thus at processing block 610, space is created in memory for the table to hold a bind state in response to an indication that an operation is a threaded rebase/bind. Referring to FIG. 5A, the opcode:

0x0000 BIND_SUBOPCODE_THREADED_SET_BIND_ORDINAL_TABLE_SIZE_ULEB(1)

indicates the threaded rebase/bind and creates space in memory for the table. At processing block 620, the state indicated by the opcodes is stored (or pushed) to the table since there is a recognition that a threaded operation is being performed. Referring back to FIG. 5A, this is performed by the opcodes:

```
0x0002 BIND_OPCODE_SET_DYLIB_ORDINAL_IMM(2)
0x0003 BIND_OPCODE_SET_SYMBOL_TRAILING_
   FLAGS_IMM(0x00, _printf)
0x000C BIND_OPCODE_SET_TYPE_IMM(1)
0x000D BIND_OPCODE_DO_BIND( ).
```

At processing block 630, the start of the rebase/bind link chain (e.g., the first linking operation of the list) is specified by opcode:

```
0x000E BIND_OPCODE_SET_SEGMENT_AND_
   OFFSET_ULEB(0x02, 0x00000000)
0x0010 BIND_SUBOPCODE_THREADED_APPLY.
```

At processing block 640, the link chain is executed (or walked) to perform the linking operations (e.g., rebase and bind operations) designated in component 410 in FIG. 5A; starting at the head of the list.

Figure 7:
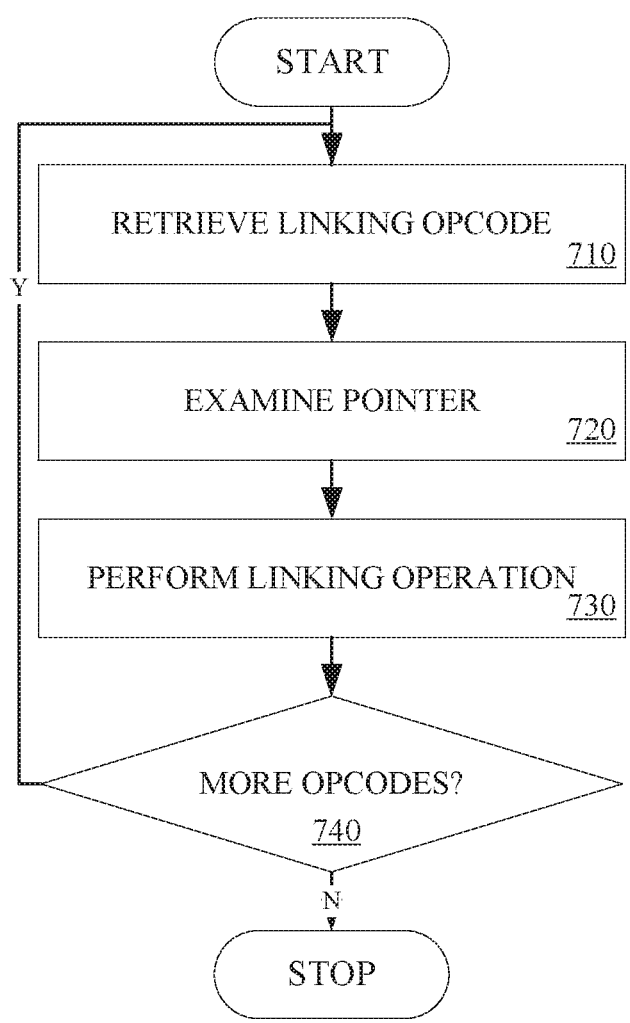
FIG. 7 illustrates one embodiment of a process for executing rebase/binding operations in the link chain.

FIG. 7 illustrates one embodiment of a process for executing rebase/binding operations in the link chain. In one embodiment, the rebase/binding execution operations described with reference to FIG. 7 are performed by the processing system based on logic associated with a linker. At processing block 710, a linking operation opcode is retrieved from linked list table structure 500. For the first operation, the operation at the head of the list (or chain) is retrieved. For instance, the opcode (BIND_OPCODE_SET_SEGMENT_AND_OFFSET_ULEB(0x02, 0x00000000) in FIG. 5A is the first opcode to be processed. In one embodiment, the corresponding segment is "_DATA_data" and an offset 0 into that segment specifies. Thus, "printf" is the first operation encountered in table structure 500. As shown in sub-component 514 the bind "printf" is represented as "_DATA_data 0x100008000 pointer 0libSystem printf with value 0x4008000000000000"

At processing block 720, the pointer in the data component 510 corresponding to the opcode is examined. According to one embodiment, each pointer includes 64-bits of data that is stored to make the chain. In such an embodiment, the pointer includes a value component and a metadata component that stores additional data for processing the linking operation. FIG. 8A illustrates one embodiment of a pointer data structure 800 implemented for a bind operation. As shown in FIG. 8A, pointer 800 is a 64-bit structure, including ordinal bits 811, reserve bits 812, and metadata bits that include addend bits 813, next bits 814, a bind bit 815 and an authentication (auth) bit 816. Ordinal bits 811 are implemented to lookup a table of binds, while addend bits 813 are implemented to get a bound pointer from the bound pointer. For instance, for "int array[4]" and a request for "&array[2]" results in a bind to "array" with the addend bits set to 8. Thus, the bind will be 8 bytes (2 ints) from the start of the array.

The next bits 814 provide an offset to a next element in the chain. The bind bit 815 indicates whether an operation to be performed is a bind or rebase, while auth bit 816 indicates whether the pointer is to be authenticated, as will be discussed in further detail below.

In one embodiment, the pointer analysis includes analyzing the metadata component to determine whether the linking operation is a rebase or bind. Thus, to process the "printf" bind shown in sub-component 514 in FIG. 5A using pointer structure 800, the value 0x4008000000000000 is analyzed to acquire ordinal=0; addend=0; next=1; bind=1; and auth=0. The bind=1 value indicates that a bind is to be performed, while auth=0 indicates that a conventional bind implementation without authentication is performed.

At processing block 730, the linking operation (e.g., rebase or bind) is processed according to the indication provided by the bind bit. In one embodiment, the ordinal is used to look up a table of binds. Subsequently, the information from the table is used to find the address of "printf" and write the address to the indicated address location. At decision block 740, a determination is made as to whether there are additional rebase/bind opcodes that are to be processed. If so, control is returned to processing block 710, where the next opcode in the linked list is retrieved. In one embodiment, the determination is made based on the next bits 714 includes in the pointer metadata component. For instance, since the next bits 714 in the "printf" pointer indicates a 1, the value is multiplied by 8 (e.g., that binds are aligned to 8-bytes for the alignment of a pointer on 64-bit architectures) to obtain the offset to the next element of the chain.

This offset leads to the rebase (_DATA_data 0x100008008 pointer 0x100007F94 with value 0x0008000100007F94) indicated in sub-component 512. Thus, the pointer for the rebase is analyzed (e.g., processing block 720 for the subsequent loop). FIG. 8B illustrates one embodiment of a pointer data structure 810 implemented for a rebase operation. In this embodiment, a 64-bit pointer structure 810 includes target bits 821, in addition to the next bits 814, bind bit 815, and auth bit 816 in the metadata component. The target 0x100007F94 points to "foo" before a binary slide is performed at runtime. To perform a rebase operation, the runtime slide from where the binary was loaded is added to 0x100007F94, and subsequently stored back to the address location. The next bits 814 again have a value of 1 that is multiplied by 8 to get next location in the chain, which is (_DATA_data 0x100008010 pointer 0x100008018 with value 0x0000000100008018). This is another rebase, which points to 0x100008018. Thus, the value is again slid and stored. Here the next bits 814 have a value of 0 that indicates the end of the chain.

In a further embodiment, the pointers are authenticated to protect against JOP and ROP attacks. FIG. 5B illustrates another embodiment of a threaded rebase/bind table structure 500 implemented for pointer authentication. In this embodiment, table structure 500 includes a component 530 that replaces component 510. Component 530 includes a sub-component 532 including one or more authenticated rebases, and a sub-component 534 including one or more authenticated binds. According to one embodiment, authentication is only performed for function pointers. As a result, the "printf" bind and the rebase to "foo" are authenticated since both are function pointers. However, the rebase to "bar" is not authenticated because it is a pointer to data.

As shown in FIG. 5B, the opcodes table is actually identical (e.g., with the exception of the indication of (JOP: diversity 0, address false, IA)), since the authentication pointer is included within the pointer data structures and the opcodes are setting up the linked list and bind table with the regular non-authenticated information. FIG. 8C illustrates one embodiment of a pointer data structure 830 implemented for an authenticated bind operation. In this embodiment, diversity bits 833, addrDiv bits 834 and key bits 835 replace the addend bits. The diversity bits 833 provide a diversity key by which the structure 830 is to be encrypted. AddrDiv bits 834 indicate whether address authentication is to be performed, while key bits 835 provide a key.

In one embodiment, the first bit of the key bits 835 indicates whether the key is for instruction (I) or data (data), and the second bit indicates JOP or ROP. For authenticated threaded rebase/bind, the auth bit 816 is set to a high value (e.g., 1) instead of a low value than (e.g., 0) as in the conventional rebase/bind implementation discussed above. The indication (JOP: diversity 0, address false, IA) in sub-component 534 provides that diversity bits 833 has a 0 value. Thus, all pointers are signed with a 16-bit diversity key of 0. Additionally, address false (e.g., addrDiv bits 834=0) provides an indication that address authentication is not to be implemented (e.g., where the address of the bind location itself is the diversity). Further, key bits 835 indicate an IA key (or instruction JOP). As discussed above, there is a jump to (_DATA_data 0x100008008 pointer 0x100007F94 with value 0x8008000000007F94 (JOP: diversity 0, address false, IA)) since the next bits 614 has a value=1.

This opcode points to "foo", which is also a signed pointer signed with a 0 diversity and IA key. FIG. 8D illustrates one embodiment of a pointer data structure 840 implemented for an authenticated rebase operation. In this embodiment, target bits 821 comprise 32 bits, rather than the 51 bits in the unauthenticated rebase embodiment. Thus, the 32-bit "target" is an offset from a virtual address of the beginning of the binary. Provided a binary "load address" of 0x100000000, the actual target value is "0x100000000+ 0x00007F94" which is the 0x100007F94, as in the unauthenticated case. At runtime, the 0x100007F94 is signed with the given JOP key, and stored back to the address location.

The next bits 814 value of 1 provides for an 8-byte jump to the next rebase: (_DATA_data 0x100008010 pointer 0x100008018 with value 0x0000000100008018). This is a rebase to a data pointer, not a function pointer, so no authentication is performed signed. As a result, the rebase is identical to unauthenticated "bar" rebase discussed. Since the next bits 814 has a 0 value the end of the linked list has been reached.

Additional Exemplary Computing Devices

Figure 9:
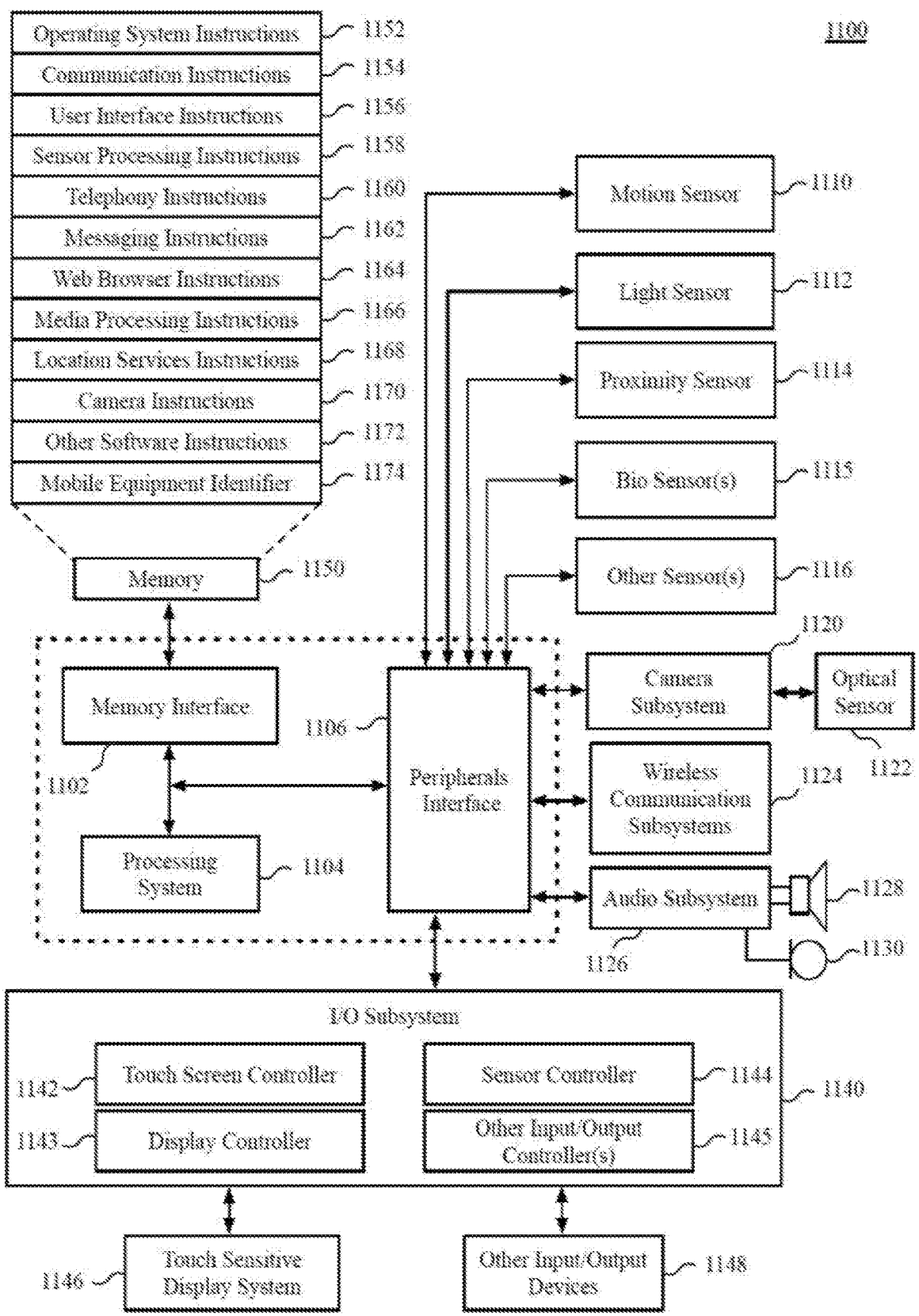
FIG. 9 is a block diagram of one embodiment of a device architecture.

FIG. 9 is a block diagram of a device architecture 1100 for a mobile or embedded device, according to an embodiment. The device architecture 1100 includes a memory interface 1102, a processing system 1104 including one or more data processors, image processors and/or graphics processing units, and a peripherals interface 1106. The various components can be coupled by one or more communication buses or signal lines. The various components can be separate logical components or devices or can be integrated in one or more integrated circuits, such as in a system on a chip integrated circuit.

The memory interface 1102 can be coupled to memory 1150, which can include high-speed random access memory such as static random access memory (SRAM) or dynamic random access memory (DRAM) and/or non-volatile memory, such as but not limited to flash memory (e.g., NAND flash, NOR flash, etc.).

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate the mobile device functionality. One or more biometric sensor(s) 1115 may also be present, such as a fingerprint scanner for fingerprint recognition or an image sensor for facial recognition. Other sensors 1116 can also be connected to the peripherals interface 1106, such as a positioning system (e.g., GPS receiver), a temperature sensor, or other sensing device, to facilitate related functionalities. A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/ or optical (e.g., infrared) receivers and transmitters. The specific design and implementation of the wireless communication subsystems 1124 can depend on the communication network(s) over which a mobile device is intended to operate. For example, a mobile device including the illustrated device architecture 1100 can include wireless communication subsystems 1124 designed to operate over a GSM network, a CDMA network, an LTE network, a Wi-Fi network, a Bluetooth network, or any other wireless network. In particular, the wireless communication subsystems 1124 can provide a communications mechanism over which a media playback application can retrieve resources from a remote media server or scheduled events from a remote calendar or event server.

An audio subsystem 1126 can be coupled to a speaker 1128 and a microphone 1130 to facilitate voice-enabled functions, such as voice recognition, voice replication, digital recording, and telephony functions. In smart media devices described herein, the audio subsystem 1126 can be a high-quality audio system including support for virtual surround sound.

The I/O subsystem 1140 can include a touch screen controller 1142 and/or other input controller(s) 1145. For computing devices including a display device, the touch screen controller 1142 can be coupled to a touch sensitive display system 1146 (e.g., touch-screen). The touch sensitive display system 1146 and touch screen controller 1142 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1146. Display output for the touch sensitive display system 1146 can be generated by a display controller 1143. In one embodiment the display controller 1143 can provide frame data to the touch sensitive display system 1146 at a variable frame rate.

In one embodiment a sensor controller 1144 is included to monitor, control, and/or processes data received from one or more of the motion sensor 1110, light sensor 1112, proximity sensor 1114, or other sensors 1116. The sensor controller 1144 can include logic to interpret sensor data to determine the occurrence of one of more motion events or activities by analysis of the sensor data from the sensors.

In one embodiment the I/O subsystem 1140 includes other input controller(s) 1145 that can be coupled to other input/control devices 1148, such as one or more buttons, rocker switches, thumb-wheel, infrared port, USB port, and/or a pointer device such as a stylus, or control devices such as an up/down button for volume control of the speaker 1128 and/or the microphone 1130.

In one embodiment, the memory 1150 coupled to the memory interface 1102 can store instructions for an operating system 1152, including portable operating system interface (POSIX) compliant and non-compliant operating system or an embedded operating system. The operating system 1152 may include instructions for handling basic system services and for performing hardware dependent tasks. In some implementations, the operating system 1152 can be a kernel.

The memory 1150 can also store communication instructions 1154 to facilitate communicating with one or more additional devices, one or more computers and/or one or more servers, for example, to retrieve web resources from remote web servers. The memory 1150 can also include user interface instructions 1156, including graphical user interface instructions to facilitate graphic user interface processing.

Additionally, the memory 1150 can store sensor processing instructions 1158 to facilitate sensor-related processing and functions; telephony instructions 1160 to facilitate telephone-related processes and functions; messaging instructions 1162 to facilitate electronic-messaging related processes and functions; web browser instructions 1164 to facilitate web browsing-related processes and functions; media processing instructions 1166 to facilitate media processing-related processes and functions; location services instructions including GPS and/or navigation instructions 1168 and Wi-Fi based location instructions to facilitate location based functionality; camera instructions 1170 to facilitate camera-related processes and functions; and/or other software instructions 1172 to facilitate other processes and functions, e.g., security processes and functions, and processes and functions related to the systems. The memory 1150 may also store other software instructions such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. A mobile equipment identifier, such as an International Mobile Equipment Identity (IMEI) 1174 or a similar hardware identifier can also be stored in memory 1150.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions may be implemented in hardware and/or in software, including in one or more signal processing and/or application specific integrated circuits.

Figure 10:
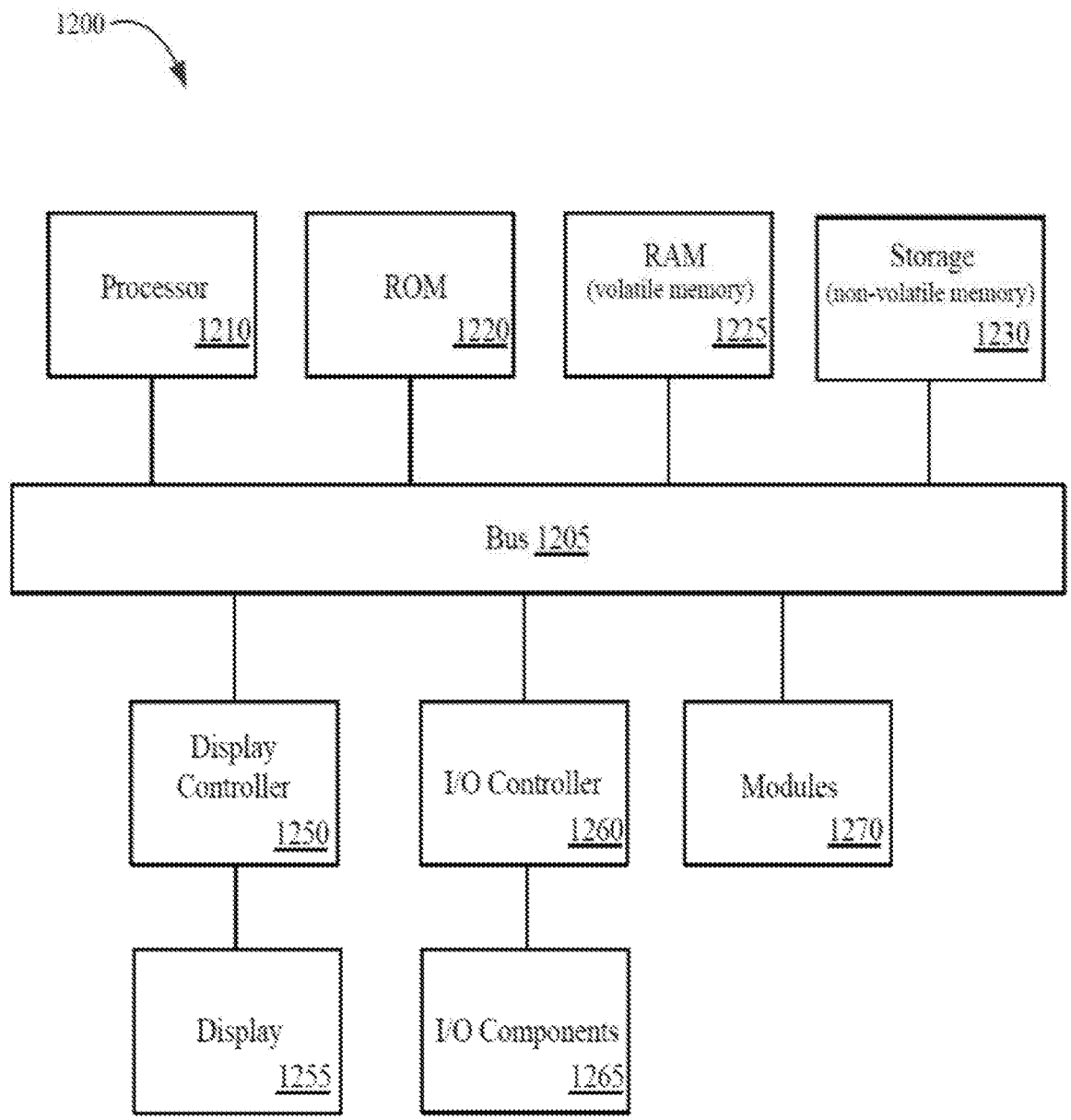
FIG. 10 is a block diagram illustrating one embodiment of a computing system.

FIG. 10 is a block diagram illustrating a computing system 1200 that can be used in conjunction with one or more of the embodiments described herein. The illustrated computing system 1200 can represent any of the devices or systems described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 can include a bus 1205 which can be coupled to a processor 1210, ROM 1220 (Read Only Memory), RAM 1225 (or volatile memory), and storage 1230 (or non-volatile memory). The processor 1210 can retrieve stored instructions from one or more of the memories (e.g., ROM 1220, RAM 1225, and storage 1230) and execute the instructions to perform processes, operations, or methods described herein. These memories represent examples of a non-transitory machine-readable medium (or computer-readable medium) or storage containing instructions which when executed by a computing system (or a processor), cause the computing system (or processor) to perform operations, processes, or methods described herein. The RAM 1225 can be implemented as, for example, dynamic RAM (DRAM), or other types of memory that require power continually in order to refresh or maintain the data in the memory. Non-volatile memory (e.g., storage 1230) can include, for example, magnetic, semiconductor, tape, optical, removable, non-removable, and other types of storage that maintain data even after power is removed from the system. It should be appreciated that the non-volatile memory can be remote from the system (e.g. accessible via a network).

A display controller 1250 can be coupled to the bus 1205 in order to receive display data to be displayed on a display device 1255, which can display any one of the user interface features or embodiments described herein and can be a local or a remote display device. The computing system 1200 can also include one or more input/output (I/O) components 1265 including mice, keyboards, touch screen, network interfaces, printers, speakers, and other devices. Typically, the input/output components 1265 are coupled to the system through an input/output controller 1260.

Modules 1270 can represent any of the functions or engines described above, including components, units, functions, or logic. Modules 1270 can reside, completely or at least partially, within the memories described above, or within a processor during execution thereof by the computing system. In addition, modules 1270 can be implemented as software, firmware, or functional circuitry within the computing system, or as combinations thereof.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A computer-implemented method comprising:
   generating, prior to runtime, a linked list table including:
   (a) a first component having linking data to be stored in a table data structure for one or more rebase and bind operations, the linking data comprising at least one pointer including a value component and a metadata component, and
   (b) a second component having instructions to implement the table data structure to perform the rebase and bind operations according to a linked list chain, at least one of the rebase and bind operations including examining an authentication component within the metadata component to determine whether the at least one pointer in the linking data is to be encrypted; and
   subsequently executing the instructions in the second component of the linked list table to perform the one or more rebase and bind operations based on the linked list chain.

2. The computer-implemented method as in claim 1, wherein executing the instructions comprises:
   creating space in memory for the table data structure;
   storing a state in the table data structure indicated in the instructions included in the second component; and
   performing the one or more rebase and bind operations based on the linked list chain.

3. The computer-implemented method as in claim 1, wherein performing the one or more rebase and bind operations based on the linked list chain comprises:
   retrieving a first linking operation opcode in the linked list table; and
   examining a pointer in the linking data corresponding to the first linking operation opcode.

4. The computer-implemented method as in claim 3, wherein examining the pointer comprises examining a bind component within the metadata component to determine whether an operation is a rebase operation or a bind operation.

5. The computer-implemented method as in claim 4, wherein performing the one or more rebase and bind operations further comprises performing the operation indicated by the bind component.

6. The computer-implemented method as in claim 4, wherein examining the pointer further comprises examining a next component in the metadata component to determine an offset to a second linking operation opcode in the linked list table.

7. A data processing system comprising:
   a non-transitory machine-readable medium storing a first set of instructions;
   one or more processors to execute the first set of instructions, wherein the first set of instructions, when executed, cause the one or more processors to perform operations including:
   generating, prior to runtime, a linked list table including:
   (a) a first component having linking data to be stored in a table data structure for one or more rebase and bind operations, the linking data comprising at least one pointer including a value component and a metadata component, and
   (b) a second component having instructions to implement the table data structure to perform the rebase and bind operations according to a linked list chain, at least one of the rebase and bind operations including examining an authentication component within the metadata component to determine whether the at least one pointer in the linking data is to be encrypted; and
   subsequently executing the instructions in the second component of the linked list table to perform the one or more rebase and bind operations based on the linked list chain.

8. The data processing system as in claim 7, wherein executing the instructions comprises:
   creating space in memory for the table data structure;
   storing a state in the table data structure indicated in the instructions included in the second component; and
   performing the one or more rebase and bind operations based on the linked list chain.

9. The data processing system as in claim 7, wherein performing the one or more rebase and bind operations based on the linked list chain comprises:
   retrieving a first linking operation opcode in the linked list table; and
   examining a pointer in the linking data corresponding to the first linking operation opcode.

10. The data processing system as in claim 9, wherein examining the pointer comprises examining a bind component within the metadata component to determine whether an operation is a rebase operation or a bind operation.

11. The data processing system as in claim 9, wherein examining the pointer further comprises examining a next component in the metadata component to determine an offset to a second linking operation opcode in the linked list table.

12. A non-transitory machine-readable medium storing instructions which, when executed by one or more processors of an electronic device, cause the one or more processors to perform operations comprising:

generating, prior to runtime, a linked list table including:
(a) a first component having linking data to be stored in a table data structure for one or more rebase and bind operations, the linking data comprising at least one pointer including a value component and a metadata component, and
(b) a second component having instructions to implement the table data structure to perform the rebase and bind operations according to a linked list chain, at least one of the rebase and bind operations including examining an authentication component within the metadata component to determine whether the at least one pointer in the linking data is to be encrypted; and subsequently executing the instructions in the second component of the linked list table to perform the one or more rebase and bind operations based on the linked list chain.

13. The non-transitory machine-readable medium as in claim 12, wherein performing the one or more rebase and bind operations based on the linked list chain comprises:

retrieving a first linking operation opcode in the linked list table; and examining a pointer in the linking data corresponding to the first linking operation opcode.

14. The non-transitory machine-readable medium as in claim 13, wherein examining the pointer comprises examining a bind component within the metadata component to determine whether an operation is a rebase operation or a bind operation.

15. The computer-implemented method of claim 1, wherein the authentication component comprises an authentication bit.

16. The data processing system of claim 7, wherein the authentication component comprises an authentication bit.

17. The non-transitory machine-readable medium of claim 12, wherein the authentication component comprises an authentication bit.

* * * * *